3,661,951
CARBOXYLATION OF OLEFINS
Eugene J. Miller, Jr., Wheaton, and Ago Maris, La Grange Park, Ill., assignors to Armour Industrial Chemical Company
Continuation of application Ser. No. 747,613, July 15, 1968, which is a continuation of application Ser. No. 450,836, Apr. 26, 1965. This application Dec. 1, 1969, Ser. No. 876,203
Int. Cl. C08h 17/36
U.S. Cl. 260—413
2 Claims

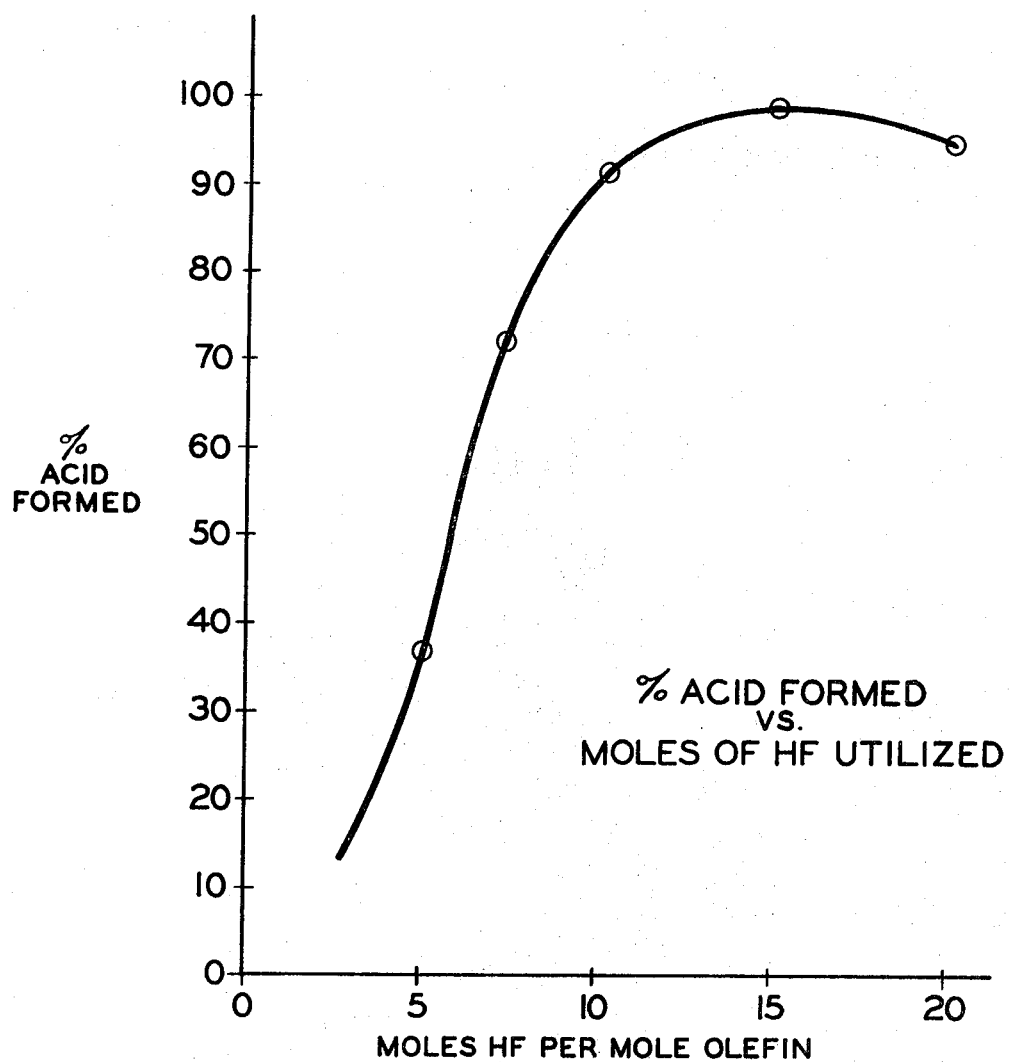

ABSTRACT OF THE DISCLOSURE

Method of carboxylating olefins with CO utilizing at least 10 moles of HF per mole of olefin plus water slightly in excess of the stoichiometric amount of olefin to obtain high yields of high quality acid.

---

This application is a continuation of application Ser. No. 747,613, filed July 15, 1968, which is a continuation of application Ser. No. 450,836 filed Apr. 26, 1965.

This invention relates to carboxylation, and more particularly to the carboxylation of olefins with carbon monoxide in the presence of hydrogen fluoride to effect extremely high yields of high quality acid.

Carboxylation of olefins using various catalysts is described in the literature. For example, in U.S. 2,831,877, it is alleged that olefins can be carboxylated using an admixture of anhydrous hydrofluoric acid, with or without boron trifluoride, chlorosulfonic acid, or fluorosulfonic acid with 90% $H_2SO_4$ as the catalyst. More recently, in U.S. 3,005,846, aqueous HF alone is disclosed as a useful catalyst in carboxylation reactions.

The trouble with these teachings and others like them, lies in the yield and in the quality of the product obtained as well as requiring a multi-step process which is not desirable for commercial exploitation. In most of them, much by-product, including a range of acids other than the particular desired acid, is formed. For example, in U.S. 2,831,877, which involves a two-step process, polymerization, formation of the alkyl fluoride and much formation of an unidentified reaction product occurs. And, in U.S. 3,005,846, which also involves a two-step process, a great deal of self-ester is obtained. There is also some polymerization. Indeed, the patentee has taken advantage of this situation in U.S. 2,975,199 by "bending" the reaction conditions to effect greater formation of the self-ester. But, no one has accomplished substantially quantitative yields, nor the improved product that is highly desirable from both an economic and a technological standpoint, nor have they simplified the process to make it commercially attractive.

An object of this invention is to provide an improved carboxylation process.

Another object is to provide a carboxylation process which occurs at relatively mild reaction conditions.

Still another object is to provide a carboxylation process which is relatively fast.

A further object is to provide a carboxylation process for olefins having high yield, in fact, almost quantitative.

A still further object is to provide a carboxylation process which effects an improved product, specifically a purer and, in some cases, a better colored product.

Other objects of the invention will in part be obvious and will in part appear hereinafter.

It has now been found that the yield, as well as the quality of carboxylic acids may be substantially improved in olefin-CO synthesis reactions, if one utilizes still greater amounts of liquid HF; in fact, more in the nature of solvent quantities, than heretofore believed necessary. A molar equivalent or slightly in excess of molar equivalent (based on the olefin) of water is also used with said large amount of HF. In contrast, in the more tedious, uneconomical two-step process of U.S. 2,831,877, the use of water in the first step of the reaction is specifically avoided. Even then, only mediocre yields are obtained. The use of equivalent or slightly more than equivalent amounts of water favors almost exclusive formation of carboxylic acid without formation of any appreciable by-products.

The ratio of olefin to HF should range from 1:10 to 1:40, the optimum amounts within said range of HF depending, in part, on the carbon content of the starting olefin. Even greater amounts of HF may be used but it offers no practical advantage to do so. The water should be present in amounts at least equivalent to the molar quantity of olefin present and preferably in slight excess of the molar quantity.

The carbon monoxide should be used at superatmospheric pressure in the range of 100 to 1500 p.s.i.g. and preferably from 300–800 p.s.i.g.

When such amounts are utilized, over 90% carboxylic acid is generally obtained particularly in the case of the lower alkyl chain olefins, and more like 95 to 99%. As indicated hereinafter, the sudden sharp peak in percent acid obtained depends upon the utilization of the particular amounts or concentrations utilized, as indicated above.

Likewise, the quality of the acid improves substantially by such unique reaction conditions. The reaction product has a better neutralization equivalent, closer to the theoretical value, and a 90% or better mass yield is obtained. In essence, a purer product is obtained.

In fact, the product is of such purity that quenching in water and solvent separation is not necessary. One can merely distill off the hydrogen fluoride and water to obtain the carboxylic acid in a very pure form.

For a fuller understanding of the nature and objects of the invention, reference should be had to the following examples which illustrate the invention in detail:

EXAMPLE I

A 300 ml. stirred Monel autoclave is charged with 120.0 gms. of liquid hydrogen fluoride (6.0 moles) and 5.94 gms. of water (0.33 mole) at approximately 0° C. The unit is secured and temperature is taken up to 26° C. A 400 p.s.i. carbon monoxide pressure is introduced and 50.5 gms. of dodecene-1 (0.30 mole) are pumped into the reactor over a period of 27 minutes at 22 to 26° C. (at 280–500 p.s.i. CO pressure). The reaction is allowed to proceed for an additional 15 minutes at 25 to 27° C. and 300–380 p.s.i. carbon monoxide pressure. The mixture is cooled to −10° C., the unit is vented and opened up. The reaction mixture is placed into a stainless steel vessel. The contents are heated with stirring over a period of 70 minutes at 15 to 150° C., at which time the fumes become neutral. A yellow liquid is left (89.6% yield).

Neutralization equivalent (NE) 239.0 (calcd. 214.3); percent acid 90.0.

EXAMPLE II 300 ml. Monel autoclave is charged with 180.0 gms. of liquid hydrogen fluoride (9.0 moles) and 13.0 gms. of water (0.72 mole) at approximately 0° C. The unit is secured and the temperature is brought up to 24° C. Carbon monoxide gas is introduced to a 490 p.s.i. pressure and 50.5 gms. of hexene-1 (0.60 mole) is pumped into the reactor over a period of 48 minutes at 23–28° C. (at 200–500 p.s.i.). The reaction is allowed to proceed for an additional 60 minutes at 26–27° C. and 200–500 p.s.i. carbon monoxide pressure. The mixture is then cooled to 0° C., the unit is vented and is opened. The reaction mixture is then transferred to a 500 ml. round-bottom stainless steel flask (equipped with magnetic stirrer, thermocouple and heating mantle). Then hydrogen fluoride is driven off by heating and stirring over a period of 3 hours at 12–150° C. 73.9 gms. of dark oil is obtained having the following analysis:

Neutralization equivalent 134.8 (calcd. 130.0); percent acid 96.5; iodine value 4.12; overall mass yield 94.9%.

EXAMPLE III

Dodecene-1, 67.3 gms. (0.40 mole) is reacted with carbon monoxide (320–510 p.s.i.) and 8.65 mgs. of water (0.48 mole) in 160.0 gms. of hydrogen fluoride (8.0 moles) essentially as in Example II.

Heat work-up of the reaction mixture gives 76.5 gms. of a yellow oil of the following analysis:

Neutralization equivalent 226.5 (calcd. 214.3); percent acid 94.6; iodine value 5.8; overall mass yield: 89.3%.

EXAMPLE IV

Propylene tetramer is carboxylated and the product worked up as in Example II.

Heat work-up of the reaction mixture gave a dark acid that analyzed as follows:

Neutralization equivalent 220 (calcd. 199.7); percent acid 90.8; sap. equivalent 196.9; iodine value 1.2; overall mass yield 96.2%.

EXAMPLE V

Octadecene-1, 63.2 gms. (0.25 mole) is reacted with carbon monoxide, (700–780 p.s.i.g.) and 4.95 gms. of water, (0.275 mole) in 150 gms. of hydrogen fluoride (7.5 moles) at 35–37° C. essentially as in Example I.

Heat work up (as in Example I) of the reaction mixture gives 68.9 gms. of an amber oil (92.4%).

Neutralization equivalent 354 (calcd. 298.5); percent acid 84.3; iodine value 4.38.

EXAMPLE VI

A mixture of $C_{11}$–$C_{15}$ alpha-olefin, 71.6 gms. (0.40 mole) is reacted with carbon monoxide (500–550 p.s.i.g.) and 9.35 gms. of water (0.52 mole) in 160 gms. of hydrogen fluoride (8.0 moles) essentially as in Example I.

Heat work up (as in Example I) of the reaction mixture gives 78.0 gms. of a dark oil (86.7%).

Neutralization equivalent 252.5 (calcd. 225); percent acid 89.0.

EXAMPLES VII–XI

In order to ascertain the effect of varying the concentration of olefin and HF, a number of runs using the same method as illustrated in Example I are made with 1-hexene as the olefin. The results tabulated are as follows:

TABLE I

| Molar ratio of reactants | | | Percent acid formed | Neutralization equivalent [1] | Mass yield acid |
|---|---|---|---|---|---|
| O: | HF: | H$_2$O | | | |
| 1 | 5 | 1.1 | 37.1 | 351 | 69.6 |
| 1 | 7.3 | 1.1 | 72.7 | 179.0 | 84.0 |
| 1 | 10 | 1.1 | 91.4 | 142.4 | 89.7 |
| 1 | 15 | 1.2 | 98.6 | 132 | 91.5 |
| 1 | 20 | 1.1 | 94.5 | 138 | 94.0 |

[1] Theoretical=130.

The data of Table I are illustrated in graph form in the attached drawing. From this drawing it is evident that about 10 moles of HF or better are required.

EXAMPLES XII–XVII

To ascertain the affect of varying the temperature as well as the concentration of HF and water, on the carboxylation of 1-octadecene, additional runs using essentially the same method as in Example V are performed and the results tabulated as follows:

TABLE II

| Molar ratio of reactants | | | Temperature, °C. | Pressure, p.s.i.g. | Percent acid formed | NE (calculated 298.5) | Mass yield acid |
|---|---|---|---|---|---|---|---|
| O: | HF: | H$_2$O | | | | | |
| 1 | 30 | 1.1 | 23–25 | 500 | 56.8 | 516 | 99.2 |
| 1 | 60 | 1.1 | 24–27 | 500 | 70.0 | 426 | 94.5 |
| 1 | 30 | 1.1 | 30–32 | 500 | 75.7 | 394 | ([1]) |
| 1 | 30 | 1.1 | 30–32 | 700 | 77.3 | 386 | ([1]) |
| 1 | 30 | 1.1 | 35–37 | 700 | 84.3 | 354 | 92.4 |
| 1 | 30 | 1.97 | 31–38 | 500 | 53.8 | 555 | 97.2 |

[1] Quantitative.

Also, from Table I, it is evident that at least 10 moles of HF to one mole of 1-hexene is critical. The yield of the desired acid suddenly jumps to the 90% or better figure when 10 moles or more of HF are used. As seen in Table II, even larger quantities of HF, coupled with higher reaction temperatures, are required for the less soluble olefins, such as 1-octadecene. The function of such large, solvent quantities of HF may best be understood by considering the following proposed reaction mechanism which is believed to represent what actually occurs:

$$RCH=CH_2 \underset{}{\overset{H^+}{\rightleftarrows}}$$
(I)

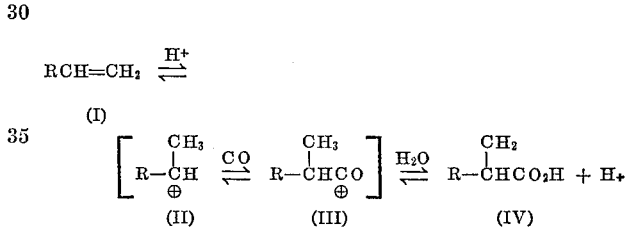

When the olefin (I) is dissolved in the HF it is in the immediate presence of at least equivalent amounts of carbon monoxide and water, thereby favoring the sequence of reactions as written. If, however, there is insufficient HF present to dissolve the olefin, there will be present a separate phase containing predominantly olefin (I) with small amounts of HF and carboxylic acid (IV). These conditions would then favor ester formation such as noted in U.S. 2,975,199 and U.S. 3,005,846 in addition to carboxylic acid. Limiting the amount of water to less than stoichiometric amounts would block further formation of acid (IV) and force the intermediates II and III to other reaction paths resulting in ester and polymer.

Straight and branched aliphatic and alicyclic olefins may be carboxylated by the method of this invention. Specifically, ethylene, propylene, butylene, isobutylene, pentene, isopentene, methyl butene, hexene, cyclohexene, methyl pentene, ethyl butene, heptene, methyl hexene, ethyl pentene, propyl butene, methylcyclohexene, octylene, nonene, dodecene, octadecene and the like may be used. Indeed, any straight or branched aliphatic or alicyclic olefin from one to 24 carbon atoms, or mixtures thereof may be used. In the case of mixtures, commercially available olefin mixtures such as the various α-olefin cuts marketed by Oronite Chemical Company, San Francisco, Calif. may be used.

It will be thus be seen that the objects set forth above, among those made apparent from the preceding description, are efficiently attained, and since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of langauge, might be said to fall therebetween.

Now that the invention has been described, what is claimed as new and desired to be secured by Letters Patent is:

1. In the method of carboxylating straight and branched aliphatic (up to 24 carbon atoms) and alicyclic olefins with carbon monoxide at a pressure of about 100 to 1500 p.s.i.g. and at a temperature of about 23° to 38° C., the improvement which accomplishes a one-step method therefor comprising gradually adding said olefins to an initial mixture of about 10 to 40 moles of hydrogen fluoride per mole of said olefins containing water slightly in excess of a stoichiometric quantity to said olefins.

2. The method of claim 1 wherein subsequently after the reaction, the hydrogen fluoride is separated from the reaction mixture by simply driving it off with heat to obtain a high yield residue of high quality acid, to the substantial exclusion of undesired by-products.

References Cited

UNITED STATES PATENTS

| | | | |
|---|---|---|---|
| 2,831,877 | 4/1958 | Koch | 260—533 AX |
| 2,975,199 | 3/1961 | Friedman et al. | 260—497 X |
| 3,005,846 | 10/1961 | Friedman et al. | 260—497 |
| 3,059,004 | 10/1962 | Waale et al. | 260—533 AX |
| 3,059,005 | 10/1962 | Vusse et al. | 260—533 AX |
| 3,059,006 | 10/1962 | Van de Vusse | 260—533 AX |
| 3,059,007 | 10/1962 | Vos et al. | 260—533 AX |
| 3,282,993 | 11/1966 | Chafetz et al. | 260—533 |

OTHER REFERENCES

Friedman et al., Journ. Org. Chem. 26, (1961), pp. 3751-3754.

LEWIS GOTTS, Primary Examiner

E. G. LOVE, Assistant Examiner

U.S. Cl. X.R.

260—533 A